United States Patent

[11] 3,582,963

[72] Inventor Allan G. Bennett
Marietta, Ohio

[21] Appl. No. 752,555
[22] Filed Aug. 14, 1968
[45] Patented June 8, 1971
[73] Assignee Sperry Rand Corporation
New York, N.Y.

[54] FREQUENCY CONTROLLABLE SYNCHRONIZING GENERATOR FOR TELEVISION SYSTEMS
10 Claims, 14 Drawing Figs.

[52] U.S. Cl. .......... 178/69.5
[51] Int. Cl. .......... H04n 5/06
[50] Field of Search .......... 178/69.5 G, 69.5 TV

[56] References Cited

UNITED STATES PATENTS

| | | | |
|---|---|---|---|
| 2,926,242 | 2/1960 | Feyzeau | 178/69.5(G) |
| 3,202,769 | 8/1965 | Coleman, Jr. | 178/69.5(TV) |
| 3,281,532 | 10/1966 | Leeds | 178/69.5(G) |
| 3,487,166 | 12/1969 | Ryan | 178/69.5(G) |

*Primary Examiner*—Richard Murray
*Attorneys*—Marshall M. Truex, Frank A. Seemar and Griffin and Branigan

ABSTRACT: The disclosure describes a frequency controllable synchronizing generator for television systems. A variable frequency oscillator applies signals to a binary divider, a presettable counter, a leading edge circuit, and a trailing circuit. One output of the binary divider drives a horizontal drive width circuit and a horizontal blanking width circuit. The output from one of the latter stages of the counter drives a vertical blanking width circuit and a vertical drive width circuit. The horizontal blanking width circuit output and the vertical blanking width circuit output are mixed to provide a mixed blanking signal. The outputs of several of the early stages of the counter and the output from the latter stage of the counter are combined with the outputs from the leading edge circuit and the trailing edge circuit, and a second output of the binary divider in logic circuits to control the generation of a plurality of outputs. The plurality of outputs from the logic circuits are mixed to provide a composite sync signal. By adjusting the oscillator and the presettable counter, frequency controllable television control signals are generated.

INVENTOR
Allan G. Bennett
BY Griffin & Branigan
ATTORNEYS

INVENTOR
Allan G. Bennett

BY Griffin & Branigan

ATTORNEYS

INVENTOR
Allan G. Bennett
BY Griffin & Branigan
ATTORNEYS

INVENTOR
Allan G. Bennett
BY Griffin & Branigan
ATTORNEYS

INVENTOR
Allan G. Bennett
BY Griffin & Branigan
ATTORNEYS

FREQUENCY CONTROLLABLE SYNCHRONIZING GENERATOR FOR TELEVISION SYSTEMS

BACKGROUND OF THE INVENTION

In commercial television systems, a synchronizing generator is used in both the television transmitter system and the television receiver system to generate synchronizing signals. The synchronizing signals control the horizontal and vertical drive, and the horizontal and vertical blanking of the television transmitter and receiver. In addition, a composite sync signal is generated and used by both the transmitter and the receiver. In general, the sync signals are used to control the horizontal and vertical drive and the horizontal and vertical blanking of the electron beam of either the TV camera or the TV receiver so that a composite TV picture is taken by the camera and is displayed on the receiver's picture tube.

In a conventional commercial system, a fixed frequency oscillator generates a pulse chain. The pulses are used to control gates that either pass or inhibit other pulses (which may also originate at the oscillator) so that the desired drive, blanking and composite sync signals are generated at predetermined periods in a picture frame cycle. It will be appreciated that the normal frame cycle for a commercial television system includes two interlaced fields. Each field includes 262½ lines resulting in a total of 525 lines per frame. More specifically, there are two vertical scans per frame and 262½ horizontal scans per vertical scan.

While prior art systems that generate 525 lines per frame are suitable for normal commercial TV systems, they have been found to be unsuitable in other environments. For example, many industrial environments require television frames having more than 525 lines so that a very "clear" TV picture is presented to the viewer. Still others require less than 525 lines per frame. Hence, a standard commercial TV system that operates on a 525 lines per frame does not meet the requirements of these particular environments. Although prior art systems can be redesigned for a greater or lesser number of lines per frame, this redesign is costly and time consuming. Even after redesign, the systems are fixed at a particular line per frame rate. Hence, it is desirable to provide a synchronizing generator network that is not "locked" to a particular line per frame rate because the provision of such a system will greatly enhance industrial TV systems in that they will be versatile and suitable for use in varying environments.

Therefore, it is an object of this invention to provide a new and improved synchronizing generator for television systems.

It is also an object of this invention to provide a new and improved synchronizing generator for television systems that is frequency controllable.

It is still another object of this invention to provide a frequency controllable synchronizing generator that generates drive, blanking and composite sync signals to control a television system so that the television system has a variable line per frame rate.

It is also an object of this invention to provide an uncomplicated and inexpensive frequency controllable synchronizing generator that is suitable for use in controlling the drive, blanking and composite sync signals of a television system.

SUMMARY OF THE INVENTION

In accordance with a principle of this invention a frequency controllable synchronizing generator suitable for use in television systems is provided. An oscillator that is frequency variable applies pulses to a binary divider, a counter, a leading edge circuit and a trailing edge circuit. One output of the binary divider controls the generation of horizontal drive width signals and horizontal blanking width signals. The output of one of the latter stages of the counter controls the generation of vertical drive width signals and vertical blanking width signals. The horizontal blanking width signals and the vertical blanking width signals are mixed to generate a mixed blanking signal. The output from one of the latter stages of the counter, the output from the leading edge circuit, the output from the trailing edge circuit and a second output from the binary divider are combined in a logic circuit with the outputs of some of the earlier stages of the counter to generate a plurality of signals. The plurality of signals are mixed to generate a composite sync signal.

In accordance with a further principle of the invention the counter is a presettable counter that divides the pulse output from the oscillator so that the output from the latter stage of the counter generates a signal at a desired vertical frame rate such as 60 cycles per second, for example. It will be appreciated by those skilled in the art that a 60 cycle per second field rate results in a 30 cycle per second frame rate resulting in the generation of a picture that does not have flicker.

In accordance with yet another principle of this invention the logic circuit consists of two subcircuits. The subcircuits include a plurality of NOR gates and flip-flops. The NOR gates and flip-flops are designed so as to gate the various input signals. The gating results in the generation of a composite sync signal having various predetermined portions, such as equalization pulses, for example.

It will be appreciated from the foregoing that a rather uncomplicated system for generating drive, blanking and composite sync signals for use in a TV system is provided. An oscillator whose frequency can be varied is utilized to control various subsystems that result in the generation of the desired signals. By providing an adjustable frequency oscillator and a counter than can be preset to divide the oscillator frequency by a predetermined number, a rather uncomplicated overall system is provided. In addition, a rather uncomplicated logic circuit consisting of flip-flops and NOR gates is provided to control the generation of a composite sync signal. Hence, both the overall system and the subsystems are uncomplicated and, therefore, inexpensive.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 1:
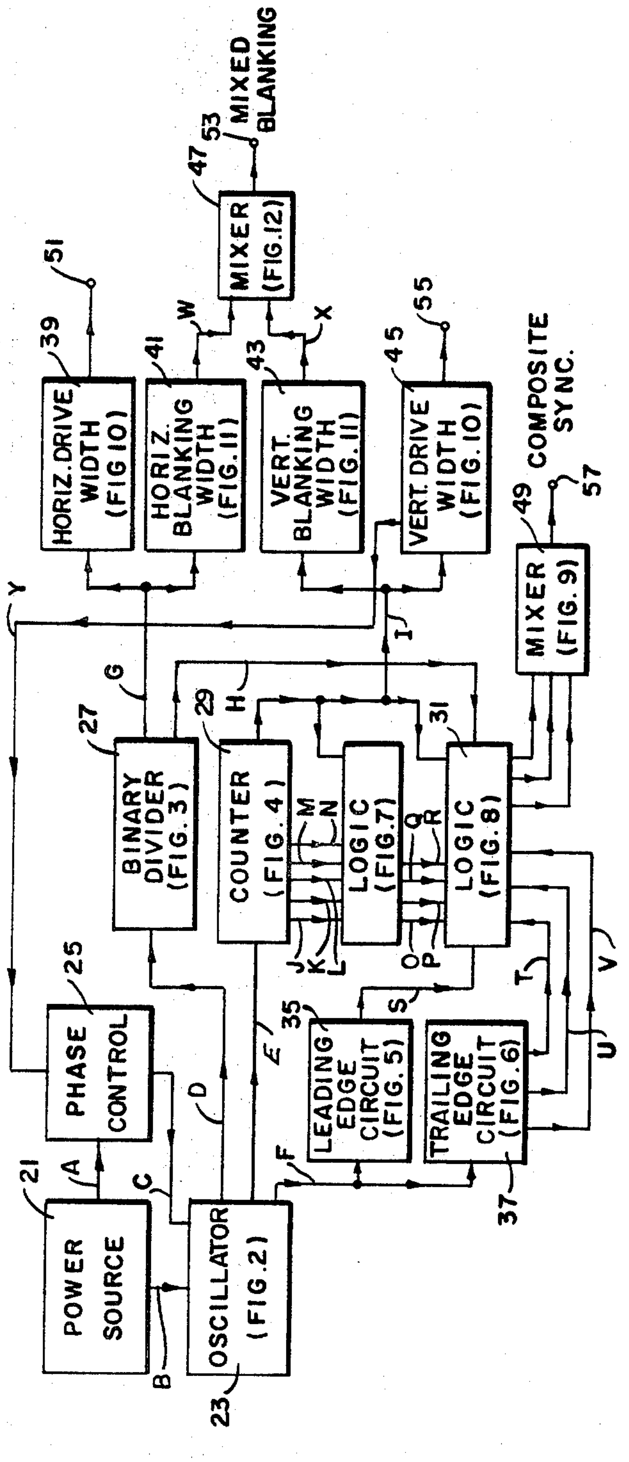
FIG. 1 is a block diagram of a preferred embodiment of the overall system of the invention.

Turning now to the drawings, FIG. 1 is a block diagram of a preferred embodiment of the frequency controllable synchronizing generator of the invention. The block diagram illustrated in FIG. 1 comprises: a power source 21; an oscillator 23; a phase control circuit 25; a binary divider 27; a counter 29; a first logic circuit 31; a second logic circuit 33; a leading edge circuit 35; a trailing edge circuit 37; a horizontal drive width circuit 39; a horizontal blanking width circuit 41; a vertical blanking width circuit 43; a vertical drive width circuit 45; a first mixer 47; and a second mixer 49.

The power source 21 has two outputs. One output is connected along line A to the one input of the phase control circuit 25. The other output from the power source 21 is connected along a line B to the input of the oscillator 23. The oscillator has a second input connected to the output of the phase control circuit by a line C.

The oscillator 23 has three outputs. One output is connected along a line D to the input of the binary divider 27. The second output of the oscillator is connected along a line E to the input of the counter 29. The third output of the oscillator is connected along a line F to the input of the leading edge circuit 35 and the input of the trailing edge circuit 37.

One output of the binary divider 27 is connected along a line G to the input of the horizontal drive width circuit 39 and to the input of the horizontal blanking width circuit 41. A second output of the binary divider 27 is connected along a line H to one input of the second logic circuit 33.

The counter 29 has a plurality of outputs. A latter stage output of the counter 29 is connected along a line I to an input of the first logic circuit 31, an input of the second logic circuit 33, the input of the vertical blanking width circuit 43, and the input of the vertical drive width circuit 45. The counter 29 also has five early stage outputs connected along lines J. K, L, M, and N to five inputs of the first logic circuit 31. The first logic circuit has four outputs connected along lines O, P, Q and R to four inputs of the second logic circuit 33.

The output of the leading edge circuit 35 is connected along a line S to a further input of the second logic circuit 33. The trailing edge circuit 37 has three outputs connected along lines T, U and V to three inputs of the second logic circuit 33.

The output of the horizontal drive width circuit 39 is connected to an output terminal 51. The output of the horizontal blanking width circuit 41 is connected along a line W to one input of the first mixer 47. The output of the vertical blanking width circuit 43 is connected along a line X to the second input of the first mixer 47 and the output from the first mixer 47 is connected to a second output terminal 53. The vertical drive width circuit 45 has two outputs. One output is a phase output and is connected along a line Y to a second input of a phase control circuit 25. The second output of the vertical drive width circuit 45 is connected to a third output terminal 55.

The second logic circuit 33 has three outputs connected along lines AA, BB and CC to three inputs of the second mixer 49. The output from the second mixer 49 is connected to a fourth output terminal 57.

The first output terminal 51 is the horizontal drive width output terminal; a second output terminal 53 is the mixed blanking output terminal; the third output terminal 55 is the vertical drive width output terminal; and the fourth output terminal 57 is the composite sync output terminal.

The invention generally operates as follows. The power source 21 is, preferably, connected to receive a 60 cycle 115 AC volt input voltage, i.e., it is connected to a convenient distribution line. The output of the power source 21 applied along line A to the phase control circuit is a 60 cycle AC signal and, hence, provides a line frequency detection signal to the phase control circuit 25. The output applied by the power source 21 along the line B is a regulated DC signal. The oscillator 23 is controllable and generates pulse signals at a predetermined frequency. The signals generated by the oscillator are of the type illustrated on lines D, E and F of FIG. 15. More specifically, lines D and F both carry positive pulses; however, line F's positive pulses are slightly delayed from line D's positive pulses. Line E's pulses are in phase with line D's pulses; however, they are inverted therefrom (i.e., they are negative).

The pulses passing along line D are divided by the binary divider 27. As illustrated on lines G and H of FIG. 15 the two outputs of the binary divider 27 are complementary and at half the frequency of the pulses on line D. The signal on line G is applied to the horizontal drive width circuit 39 and to the horizontal blanking width circuit 41. The horizontal drive width circuit's signal drives the horizontal scan of the TV system using the invention while horizontal blanking width circuit's signal is mixed with the vertical blanking width circuit's signal as hereinafter described.

Figure 4:
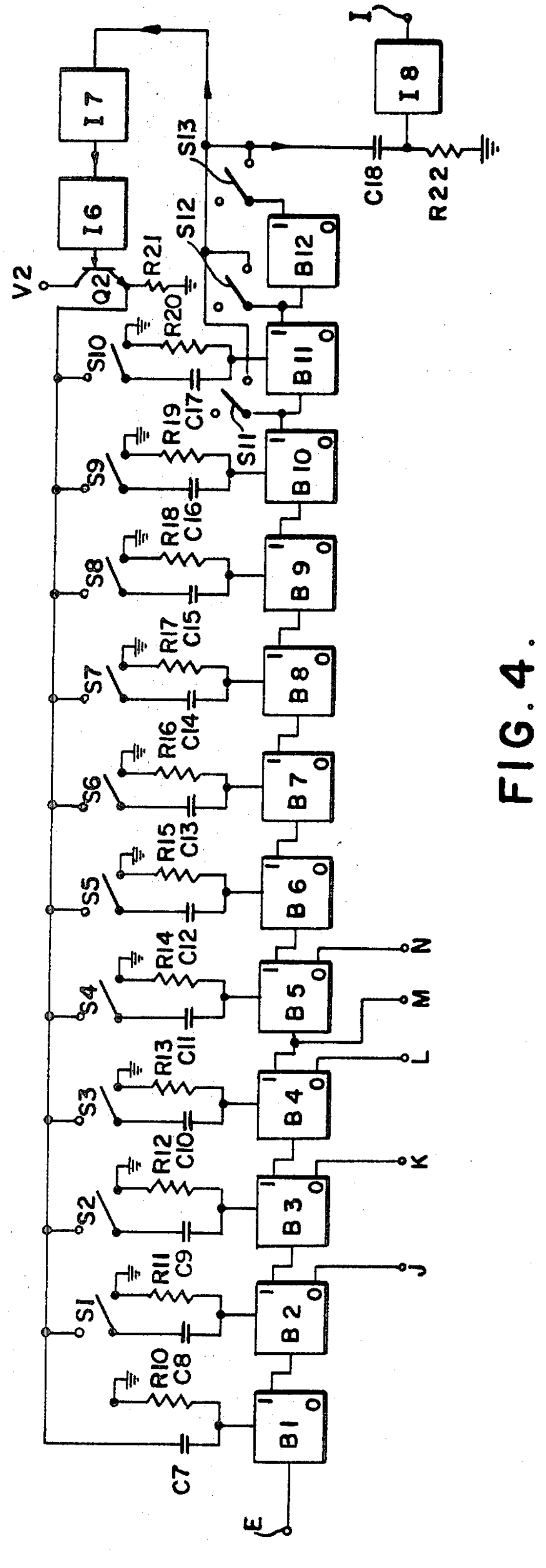
FIG. 4 is a partially block and partially schematic diagram of a counter suitable for use in the embodiment illustrated in FIG. 1.

The pulses carried by line E are applied to the counter 29. As illustrated in FIG. 4, preferably, the counter is presettable counter comprising a plurality of binary stages. In general, the counter counts the pulses applied to it by the oscillator 23 and, after a predetermined number of pulses have occurred, generates a latter stage output pulse on line I. That is, the counter divides the number of incoming pulses by its presettable setting and then generates an output pulse. The output pulse is at a frequency related to a desired field rate—60 cycles per second, for example. The only limitation on the field rate is that it must be high enough to prevent the picture displayed on the TV receiver from flickering. More specifically, as illustrated in FIG. 1, the signal on line I controls the vertical drive width circuit and the vertical blanking width circuit. The output of these circuits controls the frame rate of the picture. Hence, the I-line output of the counter controls the frame rate of the picture and this output must be at a frequency high enough to prevent flicker.

The output of the vertical blanking width circuit 43 is combined with the output from the horizontal blanking width circuit 41 in the first mixer 47 to generate a mixed blanking signal. The mixed blanking signal merely controls blanking of the electron beam during horizontal and vertical retrace periods.

In addition to controlling the vertical blanking and vertical drive width circuits, the counter also generates a plurality of output signals (including the line I signal) that are applied along lines I, J, K, L, M and N to a logic circuit of the type illustrated in FIG. 7, and hereinafter described. These signals are derived from early stages of the counter and are utilized by the FIG. 7 logic circuit to generate control signals that are applied to a logic circuit of the type illustrated in FIG. 8. The logic circuit illustrated in FIG. 8 also receives signals from the leading edge circuit 35, the trailing edge circuit 37 and the binary divider 27. In addition, the logic circuit illustrated in FIG. 8 receives the signal passing along line I. Essentially, the logic circuit illustrated in FIG. 8 is gated by its received signals so that three output signals are generated. These output signals are combined in the second mixer 49. The output of the second mixer is a composite sync signal of the type illustrated on the composite sync line of FIG. 15. A more complete discussion of how the composite sync signal is generated will be hereinafter described in conjunction with the description of the various subsystems that generate the control signals.

The vertical drive width circuit 45 generates a second signal that passes along line Y and is applied to the phase control circuit 25. This return signal is necessary if the signal on line I is 60 cycles per second and if the incoming power line signal is also 60 cycles per second because phase lock could occur between the two signals. The phase control circuit prevents phase lock between these two signals by applying a phase lock prevention signal to the oscillator along line C if phase lock occurs.

It will be appreciated from the foregoing description of FIG. 1 that the invention provides a frequency controllable synchronizing generator suitable for use in synchronizing a TV system. By controlling the frequency of an oscillator and the setting of a presettable counter a system that generate various line scan rates rather than a fixed line scan rate is created. Hence, a TV system using the frequency controllable synchronizing generator of the invention can operate at various line scan rates. Because the oscillator controls the horizontal drive and horizontal blanking width circuits and the vertical drive and blanking width circuits (through the counter) the operation of all of these circuit is in synchronism for any particular oscillator and counter settings. In addition because the oscillator controls the counter and the leading and trailing edge circuits the outputs of these circuits are also synchronized. These latter synchronized signals are utilized by the logic circuits to generate the composite sync signal. Hence, the composite sync signal is in synchronism with the horizontal drive width signal, the vertical drive width signal and the mixed blanking signal. Consequently, when the oscillator or the counter are varied in a predetermined manner, the outputs from the over all system are also varied. However, the outputs remain in synchronism. Because of this synchronism of operation the slanting or other undesirable picture conditions are not created even though the picture line rate is varied.

For a better understanding of the invention, reference is now made to FIGS. 2—14 which illustrate preferred embodiments of the various component parts or subsystems of the overall system of the invention. While the circuits illustrated in FIGS. 2—14 are preferred embodiments of the subsystems of the invention, it will be appreciated by those skilled in the art and others that various other modifications can be made within the general scope of the invention as herein described.

Figure 2:
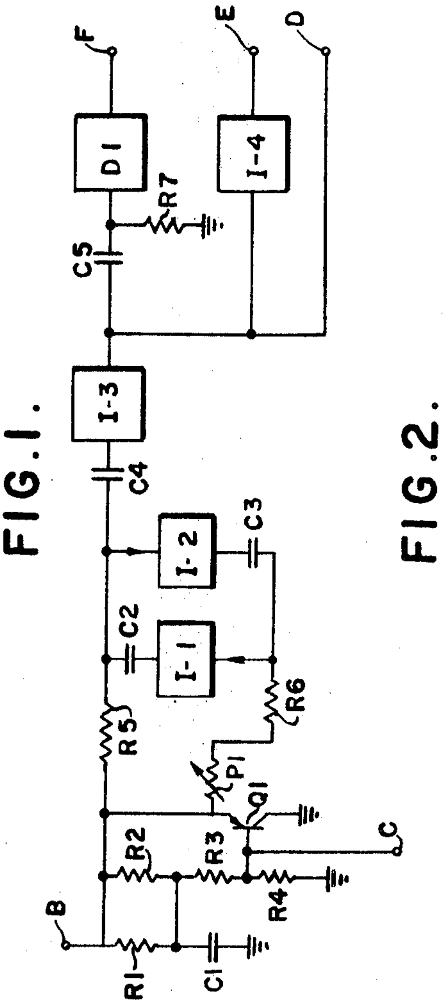
FIG. 2 is a partially block and partially schematic diagram of an oscillator suitable for use in the embodiment illustrated in FIG. 1.

FIG. 2 is a partially schematic and partially block diagram of an oscillator suitable for use with the invention. The oscillator illustrated in FIG. 2 comprises: seven resistors designated R1 through R7, respectively; five capacitors designated C1 through C5 respectively; four inverters designated I1 through I4, respectively; a delay designated D1; a potentiometer designated P1 and PNP transistor designated Q1.

The DC signal on line B (which originates at the power source) is connected through R1 in series with C1 in that order to ground. The junction between R1 and C1 is connected through R3 in series with R4 in that order to ground. The junction between R1 and C1 is also connected through R2 to the emitter of Q1. The collector of Q1 is connected to ground. The junction between R3 and R4 is connected to the base of Q1 and to line C. The collector of Q1 is connected through P1 in series with R6 in that order to the input of I-1. The emitter of Q1 is also connected through R5 in series with C2 in that order to the output of I-1.

The junction between R5 and C2 is connected to the input I-2 and the output of I-2 is connected through C3 to the input of I-1. The junction between R5 and C2 is connected through C4 to the input of I-3. The output of I-3 is connected: through C5 to the input of D1; to the input of I-4; and to line D. The junction between C5 and D1 is connected through R7 to ground. The output of I-4 is connected to line E and the output of D1 is connected to line F.

Essentially, the oscillator is an edge stable multivibrator. It can only maintain one state for a given period of time; then it reverts back to another state and back to the other one again and so on. It is this back and forth operation that creates oscillations. Briefly, the incoming DC signal is coupled by Q1 and P1 to control the circulation of signals through I-1, C2, I-2 and C3. In general, the voltage of one of the two capacitors builds up to a predetermined level. When the level is reached, a current flows through its opposite inverter line, i.e., a pulse is formed. Thereafter, the second capacitor builds up to a predetermined voltage level causing a current flow through its opposite inverter line. Hence, the signal detected by C4 is a chain of pulses. The frequency of the pulses is determined by the setting of P1. Hence, P1 controls the frequency of oscillation. The pulses sensed by C4 are inverted by I-3 and applied to line D. The pulses passing through I-3 are further inverted by I-4 and applied to line E. In addition, the pulses passing through I-3 are delayed by D1 and then applied to line F. Lines D, E and F of FIG. 15 illustrate the pulses on lines D, E and F.

Figure 3:
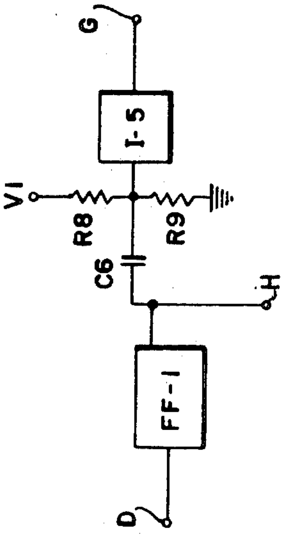
FIG. 3 is a partially block and partially schematic diagram of a binary divider suitable for use in the embodiment illustrated in FIG. 1.

FIG. 3 is a partially schematic and partially block diagram of a binary divider suitable for use in the embodiment of the invention illustrated in FIG. 1. The binary divider illustrated in FIG. 3 comprises: a flip-flop designated FF-1; a capacitor designated C6; first and second resistors designated R8 and R9; and an inverter designated I-5. Line D is connected to the input of FF-1 and the output of FF-1 is connected to line H and through C6 to the input of I-5. The junction between C6 and I-5 is connected through R9 to ground and through R8 to a voltage source designated V1. The output of I-5 is connected to line G.

In operation, the binary divider as illustrated in FIG. 3 merely divides the incoming signal by two. That is, each incoming pulse causes the FF-1 to change state. Hence, the output of FF-1 is exactly one-half the frequency of the input to FF-1. The output of FF-1 is directly connected to line H and is inverted by I-5 and then connected to line G. Hence, as illustrated in FIG. 15, the output of FF-1 on line G is the complement of the output of FF-1 on line H. C6, R8 and R9 merely provide a coupling network for I-5. V1 provides a suitable bias.

FIG. 4 is a partially schematic and partially block diagram of a counter suitable for use in the embodiment of the invention illustrated in FIG. 1. The counter illustrated in FIG. 4 comprises: 12 binary stages designated B1 through B12, respectively; 12 capacitors designated C7 through C18, respectively; 13 resistors designated R10 through R22, respectively; 13 single-pole double-throw switches designated S1 through S13, respectively; a transitor designated Q2; and three inverters designated I-6 through I-8. Line E is connected to the input of B1. The output of B1, designated the 1-output is connected to the input of B2. Similarly, the 1-output of B2 is connected to the input of B3 and so on through the 12 stages until the 1-output of B11 is connected to the input of B12. Each binary stages has a preset input located at the top of each B block illustrated in FIG. 4. The preset inputs of B1 through B11 are connected to one terminal of C7 through C17 separately and respectively.

The other terminal of C7 is connected to one terminal of S1 through S10 and the emitter of Q2. The other terminals of C8 through C17 are connected to the common terminals S1 through S10, separately and respectively. The presettable terminals of B1 through B11 are connected by R10 through R20, respectively, to ground. The ground terminal side of R11 through R20 are connected separately and respectively to the other terminal of S1 through S10.

The 0-output of B2 is connected to line J; the 0-output of B3 is connected to line K; the 0-output of B4 is connected to line L; the 1-output of B4 is connected to line M; and the 0-output of B5 is connected to line N.

One terminal of each S11 through S13 is unconnected. The common terminal of S11 is connected to the 1-output of B10. The common terminal S12 is connected to the 1-output of B11 and the common terminal of S13 is connected to the 1-output of B12. The other terminals of S11 through S13 are connected together and to the input of I-7. The output of I-7 is connected through I-6 in the base of Q2. The collector of Q2 is connected to a bias voltage source designated V2. The input of I-7 is also connected through C18 in series with R22 in that order to ground. The junction between C18 and R22 is connected through I-8 to the line I.

The counter illustrated in FIG. 4 is preset by the setting of switches S1 through S10. These switches connect C8 through C17 to the ground or to the emitter of Q2. The setting of S11 through S12 determines which stage of B10 through B12 will be the counter last stage. The last stage generates a pulse that recycles the counter through I-7 and I-6 and Q2. The recycling pulse is also the output pulse that is ultimately applied to line I through I-8. Hence, in general, the counter of FIG. 4 is merely a divider circuit that divides the number of pulses from the oscillator is a predetermined manner. After a predetermined number of pulses occurs, the system is recycled and an output pulse on line I is generated. Preferably, this output pulse occurs at a 60 cycle per second frequency. It will be appreciated by those skilled in that art that with an incoming signal on line E that is at a known frequency, the counter can be preset so that a 60 cycle signal is generated. Because the signals on lines J, K, L, M and N are taken from known counter stages, they can be used as hereinafter described to control other electronic circuits such as the logic circuits illustrated in FIGS. 7 and 8.

Figure 5:
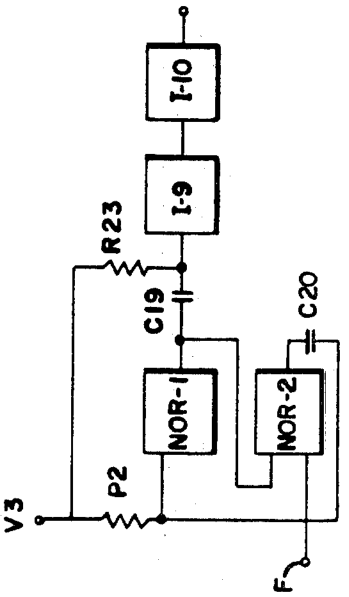
FIG. 5 is a partially block and partially schematic diagram of a leading edge circuit suitable for use in the embodiment illustrated in FIG. 1

FIG. 5 is a partially schematic and partially block diagram illustrating a leading edge circuit suitable for use in the embodiment of the invention illustrated in FIG. 1. The leading edge circuit illustrated in FIG. 5 comprises: first and second NOR gates designated NOR-1 and NOR-2; first and second capacitors designated C19 and C20; a resistor designated R23; a potentiometer designated P2; and, first and second inverters designated I-9 and I-10. NOR-1 is a single input NOR gate and NOR-2 is a dual input NOR gate. One input of NOR-2 is connected to line F. The output of NOR-2 is connected through C20 to the input of NOR-1. The output of NOR-1 is connected to the input of NOR-2 and through C19 to the input of 19. The input of NOR-1 is also connected through P2 in series with R2 to the input of 19. Tee junction between P2 and R2 is connected to a bias voltage source designated V3. The output of I-9 is connected through I-10 to line S.

Essentially, the leading edge circuit illustrated in FIG. 5 is a monostable multivibrator. When a pulse is detected on line F, NOR-1 and NOR-2 change states. When this occurs a pulse passes through C19, I-9 and I-10 to line S. After a period of time determined by the value of the circuit components and the settling of P2, the circuit resets to its initial state.

Figure 6:
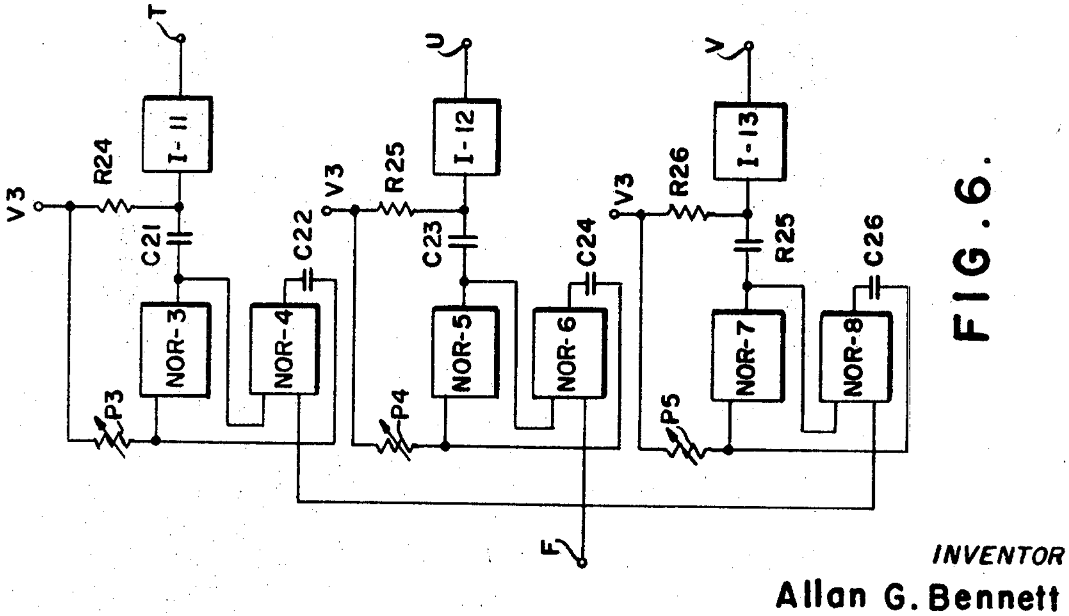
FIG. 6 is a partially block and partially schematic diagram of a trailing edge circuit suitable for use in the embodiment illustrated in FIG. 1.

FIG. 6 is a partially schematic and partially block diagram illustrating a trailing edge circuit suitable for use in the embodiment of the invention illustrated in FIG. 1. The trailing edge circuit illustrated in FIG. 2 comprises: six NOR gates designated NOR-3 through NOR-8 respectively; six capacitors designated C21 through C26, respectively; three potentiometers designated P3 through P5, respectively; three resistors designated R24 through R26, respectively; and three inverters designated I-11 through I-13 respectively.

NOR-3 and NOR-4, NOR-5 and NOR-6 and NOR-7 and NOR-8 each from a monostable multivibrator of the type illustrated in FIG. 5. NOR-3, NOR-5 and NOR-7 are each single input NOR gates and NOR-4 and NOR-6 and NOR-8 are each dual input NOR gates. Line F is connected to one input of NOR-4, NOR-6 and NOR-8. The output of NOR-4 is connected through C22 to the input of NOR-3 and the output of NOR-3 is connected to the second input of NOR-4. Similarly, the output of NOR-6 is connected by C24 to the input of NOR-5 and the output of NOR-5 is connected to the second input of NOR-6. The output of NOR-8 is connected by C26 to the input of NOR-7 and the output of NOR-7 is connected to the second input of NOR-8.

P3 is connected in series with R24 between the input of NOR-3 and the input of I-11; P4 is connected in series with R25 between the input of NOR-5 and the input of I-12; and P5 is connected in series with R36 between the input of NOR-7 and the input of I-13. The junctions between: P3 and R24; P4 and R25; and P5 and R26 are all connected to a voltage source designated V3. Finally, I-11 is connected to line T; I-12 is connected to line U, and I-13 is connected to line V.

It will be appreciated that the three separate monostable multivibrators illustrated in FIG. 6 are identical to the monostable multivibrator illustrated and described with respect to FIG. 5. In general, upon the occurrence of an input pulse the pairs of NOR gates reverse states and generate output pulses along lines T, U and V. The only difference between the three monostable multivibrator stages is that the coupling capacitors have different values so that the output pulses on lines T, U and V occur at different time sequences. The pulse sequence relationship between lines T, U and V is illustrated on the timing diagram of FIG. 15.

Figure 7:
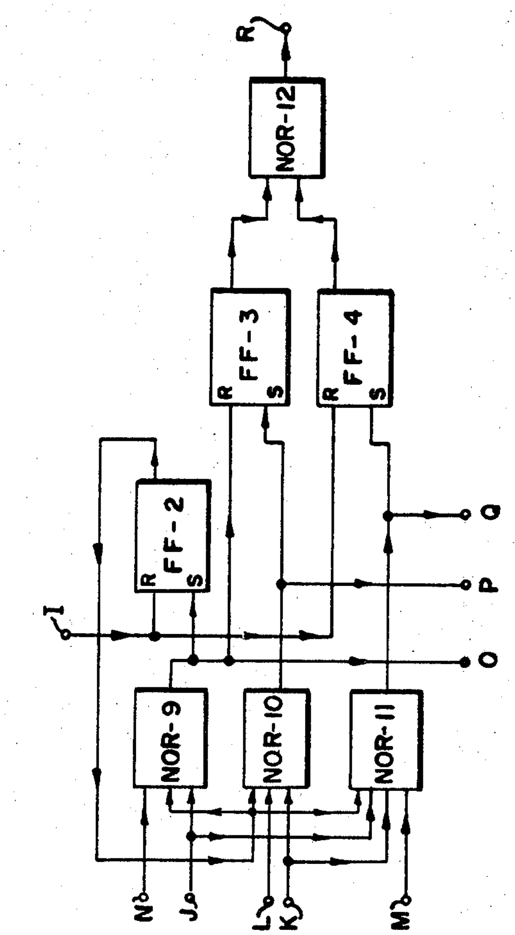
FIG. 7 is a block diagram of a logic circuit suitable for use in the embodiment illustrated in FIG. 1.
Figure 8:
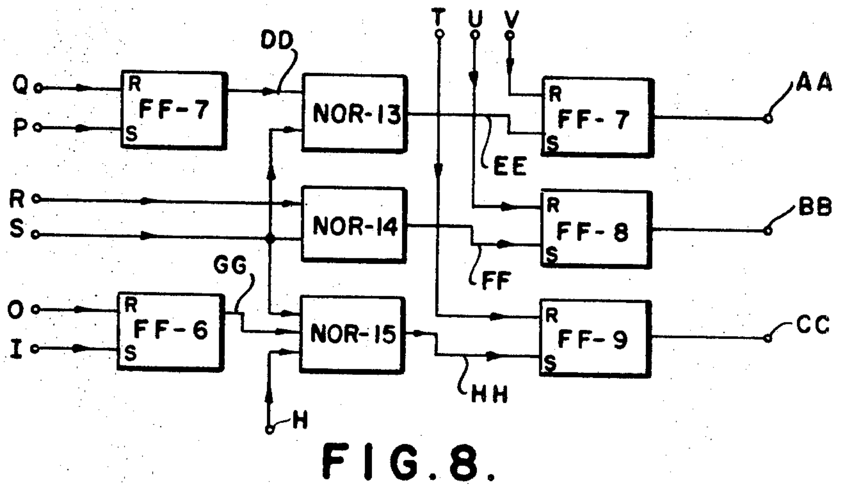
FIG. 8 is a block diagram of a logic circuit suitable for use in the embodiment illustrated in FIG. 1.

FIG. 7 is a block diagram illustrating a preferred embodiment of the first logic circuit 31 of FIG. 1. The logic circuit illustrated in FIG. 7 comprises four NOR gates designated NOR-9 through NOR-12, respectively, and three flip-flops designated FF-2 through FF-4, respectively. The first and second NOR gates, NOR-9 and NOR-10, are three input NOR gates; the third NOR GATE, NOR-11 is a four input NOR gate; and the fourth NOR gate, NOR-12 is a two input NOR gate. Each flip-flop has set and reset inputs.

Line I is connected to the reset inputs of FF-2 and FF-4. Line N is connected to one input of NOR-9. Line J is connected to one input of NOR-9 and one input of NOR-11. Line L is connected to one input of NOR-10 Line K is connected to one input of NOR-10 and one input of NOR-11, and line M is connected to one input of NOR-11. The output of FF-2 is connected to one input of NOR-9, one input of NOR-10, and one input of NOR-11. The output of NOR-9 is connected to the set input of FF-2, the reset input of FF-3 and line O. The output of NOR-10 is connected to the set input of FF-3 and line P. The output of NOR-11 is connected to the set input of FF-4 and line Q. The output of FF-3 and FF-4 is connected to the separate inputs of NOR-12 and the output of NOR-12 is connected to line R.

The logic circuit illustrated in FIG. 7 merely interprets the outputs from the counter and generates a plurality of output signals on lines O, P, Q and R at various time intervals in a single count cycle. These signals are then utilized by the second logic circuit illustrated in FIG. 8 and hereinafter described in conjunction with the leading and trailing edge circuit signals and the binary divider signal to generate a composite sync signal.

FIG. 8 is a block diagram of a second logic circuit suitable for use in the embodiment of the invention illustrated in FIG. 1 and comprises: five flip-flops designated FF-5 through FF-9, respectively; and three NOR gates designated NOR-13 through NOR-15, respectively. Each flip-flop has a set input and a reset input and the first and second NOR gates, NOR-13 and NOR-14, are two input NOR gates while the third NOR gate, NOR-15 is a three input NOR gate.

Line Q is connected to the reset input of FF-5 and line P is connected to the set input of FF-5. The output of FF-5 is connected by a line DD to one input of NOR-13. The output of NOR-13 is connected by a line EE to the set input of FF-7 and line V is connected to reset input of FF-7. Line R is connected to one input of NOR-14. Line S is connected to the second input of NOR-13, the second input of NOR-14 and one input of NOR-15. The output of NOR-14 is connected by a line FF to the set input of FF-8 and line U is connected to the reset input of FF-8.

Line O is connected to the reset input of FF-6 and line I is connected to the set input of FF-6. The output of FF-6 is connected to a second input of NOR-15 by a line GG. Line H is connected to the third input of NOR-15. The output of NOR-15 is connected by a line HH to the set input of FF-9 and line T is connected to the reset input of FF-9. The output of FF-7 is line AA, the output of FF-8 is line BB and the output of FF-9 is line CC of FIG. 1.

The logic circuit illustrated in FIG. 8 merely interprets its input signals to generate a plurality of output signals that when combined represent the composite sync. The timing diagram illustrated in FIG. 15 shows the signals at various points in FIG. 8. The signals are combined in the various NOR circuits and generate output pulses when all of the NOR inputs are inhibited. These output pulses set FF-7 through FF-9. Thereafter, the pulses from the trailing edge circuit reset the flip-flops. In this manner a plurality of signals are generated.

These signals are illustrated on lines AA, BB and CC of FIG. 15.

Figure 9:
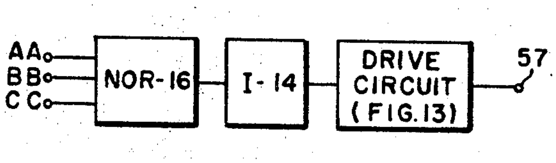
FIG. 9 is a block diagram of a mixer suitable for use in the embodiment illustrated in FIG. 1.

FIG. 9 illustrates a mixing circuit suitable for mixing the outputs of lines AA, BB and CC of FIG. 8. The circuit illustrated in FIG. 9 comprises a single NOR gate designated NOR-16, a single inverter designated I-14 and a drive circuit illustrated in block form and hereinafter described with respect to FIG. 13.

NOR-16 is a three input NOR gate and receives the signals on lines AA, BB and CC. The output from NOR-16 is connected through I-14 to the drive circuit. The output of the drive circuit is connected to the output terminal 57. The circuit illustrated in FIG. 9 mixes its input signals to generate a composite sync output signal of the type illustrated on the composite sync of FIG. 15. It will be appreciated that the composite sync line is merely a continuation of lines AA, BB and CC as illustrated on those lines in FIG. 15.

Figure 10:
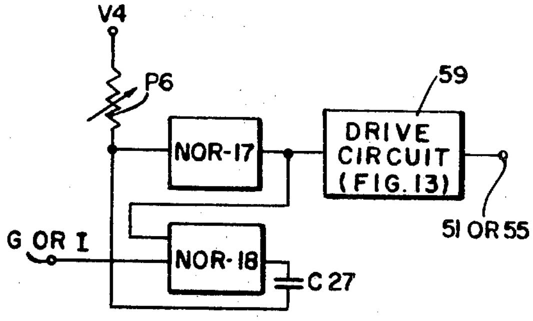
FIG. 10 is a partially block and partially schematic diagram of a horizontal or vertical drive network suitable for use in the embodiment illustrated in FIG. 1.

FIG. 10 is a partially schematic and partially block diagram of a horizontal or vertical drive width circuit suitable for use in the embodiment of the invention illustrated in FIG. 1. The circuit illustrated in FIG. 10 comprises: first and second NOR gates designated NOR-17 and NOR-18; a potentiometer designated P6; and a capacitor designated C27. In addition, the circuit illustrated in FIG. 10 includes a drive circuit 59 of the type illustrated in FIG. 13 and hereinafter described. NOR-17 is a single input NOR gate and NOR-18 is a dual input NOR gate. 5 and 6.

The signal on Line G or I is connected to one input of NOR-18; the output of NOR-18 is connected through C27 to the input of NOR-17. The input of NOR-17 is also connected through P6 to a voltage source designated V4. The output of NOR-17 is connected to the second input of NOR-18 and to the input of the drive circuit 59. The output of the drive circuit 59 is connected to the horizontal or vertical drive width output terminal 51 or 55. Essentially, the pair of NOR gates connected as herein described comprises a monostable vibrator of the type illustrated in FIGS. 5 and 6. In general, upon the occurrence of an incoming pulse, the NOR gates switch states and an output pulse is generated. Thereafter, the NOR gates reset to their initial states. The time between set and reset is determined by the value of C27 and the setting of P6.

Figure 11:
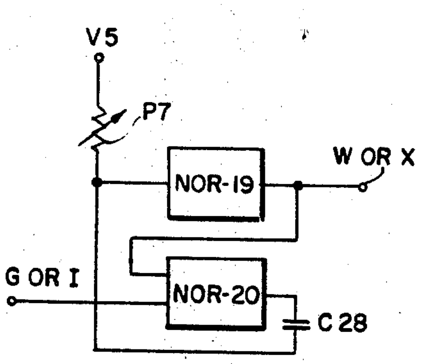
FIG. 11 is a partially block and partially schematic diagram of a horizontal or vertical blanking width network suitable for use in the embodiment illustrated in FIG. 1.

FIG. 11 is a partially schematic and partially block diagram of a horizontal or vertical blanking width circuit suitable for use in the embodiment of the invention illustrated in FIG. 1. The circuit illustrated in FIG. 11 comprises: first and second NOR gates designated NOR-19 and NOR-20; a potentiometer designated P7; and a capacitor designated C28. NOR-19 is a single input NOR gate and NOR-20 is a dual input NOR gate. The signal line on G or I is connected to one input of NOR-20. The output of NOR-20 is connected through C28 to the input of NOR-19. The input of NOR-19 is also connected through P7 to a voltage source designated V5. The output of NOR-19 is connected to the second input of NOR-20 and to lines W and X.

As with FIG. 10, FIG. 11 illustrates a monostable multivibrator of the type generally illustrated in FIGS. 5 and 6. Upon the occurrence of an input signal, the NOR gates change states, and after a predetermined period of time they reset to their initial states. The period of time is determined by the value of C28 and the setting of P7.

Figure 12:
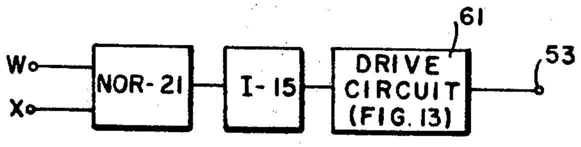
FIG. 12 is a block diagram of a mixer suitable for mixing horizontal and vertical blanking width signals and suitable for use in the embodiment illustrated in FIG. 1.

FIG. 12 is a block diagram of a mixer 47 suitable for use in the embodiment of the invention illustrated in FIG. 1. The mixer illustrated in FIG. 12 comprises: a single dual input NOR gate designated NOR-21; a single inverter designated I-15 and a drive circuit of the type illustrated in FIG. 13 and hereinafter described. Lines W and X are connected separately to the two inputs of NOR-21. The output of NOR-21 is connected through I-15 to the input of the drive circuit 61. The output of the drive circuit 61 is connected to the mixed blanking output terminal 53. The circuit illustrated in FIG. 12 combines the horizontal blanking width circuit output and the vertical blanking width circuit output and generates a mixed blanking width output signal of the type illustrated on the mixed blanking line of FIG. 15.

Figure 13:
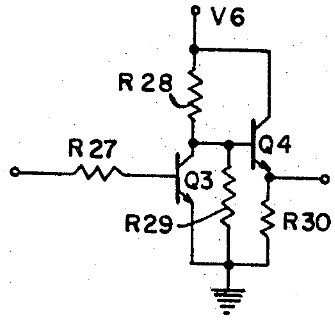
FIG. 13 is a schematic diagram of a drive circuit suitable for use in various subportions of the embodiment illustrated in FIG. 1.
Figure 14:
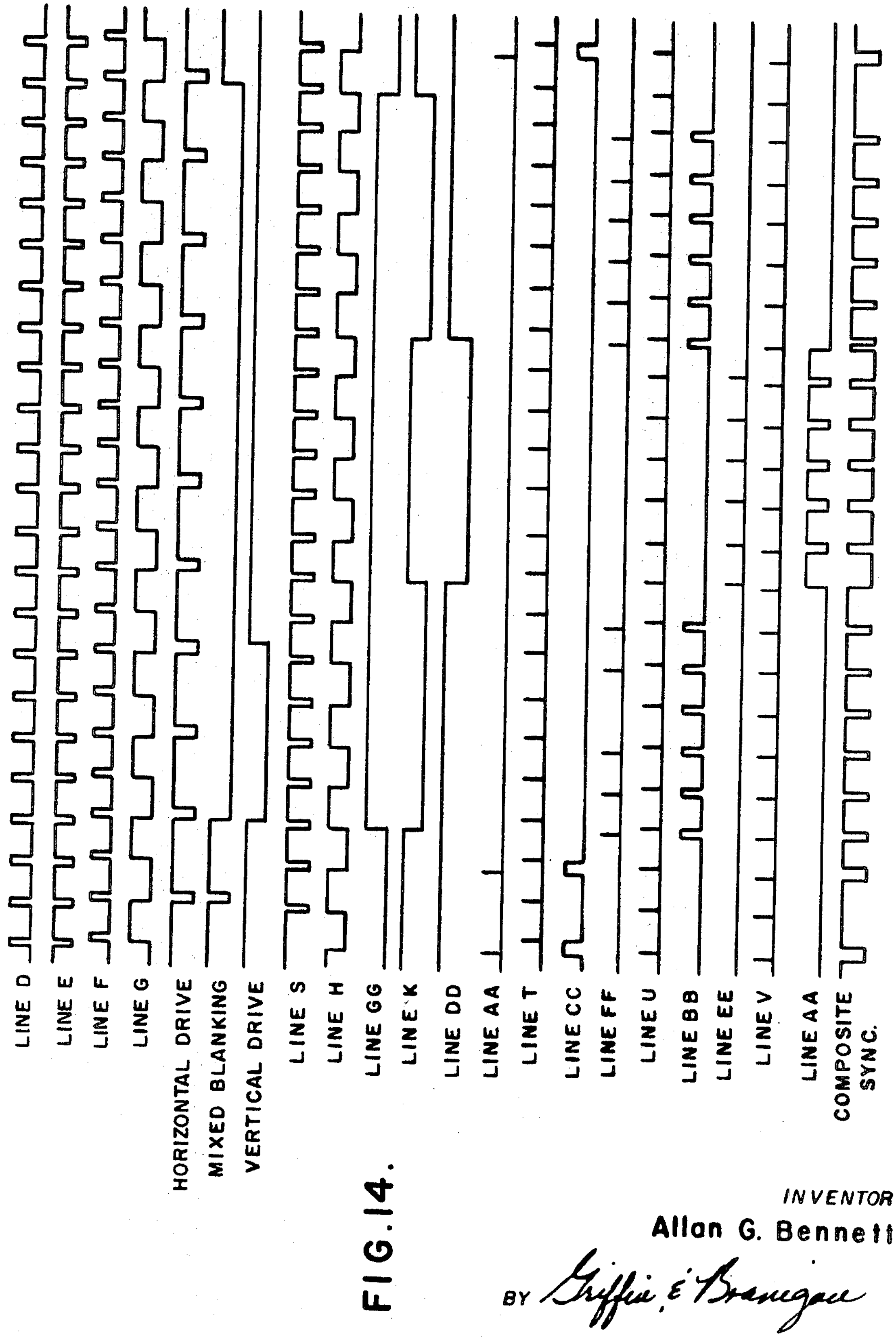
FIG. 14 is a simplified timing diagram illustrating the timing of various portions of the embodiment illustrated in FIG. 1.

FIG. 13 illustrates a drive circuit suitable for use in FIGS. 9, 10 and 12. The drive circuit illustrated in FIG. 13 comprises: two transistors designated Q3 and Q4; and four resistors designated R27, R28, R29 and R30. The incoming signal to the drive circuit is connected through R27 to the base of Q3. The emitter of Q3 is connected to ground. The collector Q3 is connected through R28 to a voltage source designated V6. The collector of Q3 is also connected to the base of Q4 and through R29 to ground. The collector of Q4 is connected to V6. The emitter of Q4 is connected through R30 to ground and to an output terminal. The drive circuit illustrated in FIG. 13 senses the incoming signal and provides an output signal suitable for driving further electronic circuitry.

It will be appreciated from the foregoing description of the subsystems of the invention that a rather uncomplicated and, therefore, inexpensive variable frequency synchronizing generator suitable for use in a TV system is provided. The apparatus for carrying out the overall system of the invention includes a plurality of simple NOR gates, flip-flops, inverters, and electronic components. None of these elements are complicated or expensive; hence, the overall system is inexpensive. It will be appreciated that the various voltages designated as VI through V6 in the figures may be connected to the power source 21 illustrated in FIG. 1. The connections were deleted from FIG. 1 for purposes of clarity.

It will be appreciated from the foregoing description of the overall system of the invention and the various subsystems that a relatively uncomplicated but highly reliable frequency controllable synchronizing generator is provided. The overall invention merely includes an adjustable frequency oscillator in combination with a binary divider, a counter, a leading edge circuit and a trailing circuit in conjunction with various logic circuits to provide a plurality of variable frequency signals. The signals are in synchronisms since the varying of the output of the oscillator or the varying of the setting of the counter are time related to the output signals. The resulting output signals—horizontal drive width signals, vertical drive width signals, mixed blanking signals and composite sync signals—are suitable for direct application to a TV system.

While the foregoing has described a preferred embodiment of the invention, it will be appreciated by those skilled in the art and others that various changes can be made in light of this disclosure. Hence, the invention can be practiced otherwise than as specifically described herein.

What I claim is:

1. A frequency controllable synchronizing generator for television systems comprising:

adjustable oscillator means that is frequency adjustable over a predetermined range for generating timing signals that are frequency constant at the point of adjustment;

presettable counter means connected to a first output of said adjustable oscillator means for dividing the output of said adjustable oscillator means in accordance with the setting of said presettable counter means;

horizontal circuit means connected to a second output of said adjustable oscillator means for generating horizontal drive width and blanking width signal;

vertical circuit means connected to an output of said presettable counter means for generating vertical drive width and blanking width signals;

leading and trailing edge circuit means connected to a third output of said adjustable oscillator means for generating edge indicating signals related to the leading and trailing edge of the timing signals generated by said adjustable oscillator means; and logic means connected to outputs of said presettable counter means and to said leading and trailing edge circuit means for generating signals in accordance with the outputs of said presettable counter means and said leading and trailing edge circuit means.

2. A frequency controllable synchronizing generator for television systems as claimed in claim 1 wherein said horizontal circuit means includes a horizontal drive width circuit and a horizontal blanking width circuit.

3. A frequency controllable synchronizing generator for television systems as claimed in claim 2 including a binary divider connected between the output of said adjustable oscillator means and the inputs of said horizontal drive width circuit and said horizontal blanking width circuit.

4. A frequency controllable synchronizing generator for television systems as claimed in claim 3 wherein said leading and trailing edge circuit means includes a leading edge circuit and a trailing edge circuit each connected to an output of said adjustable oscillator means and having outputs connected to said logic means.

5. A frequency controllable synchronizing generator for television systems as claimed in claim 4 wherein said vertical circuit means includes a vertical blanking width circuit and a vertical drive width circuit both of said circuits driven by an output of said presettable counter means.

6. A frequency controllable synchronizing generator for television systems as claimed in claim 5 including a first mixer having its inputs connected to the outputs of said horizontal blanking circuit and said vertical blanking width circuit.

7. A frequency controllable synchronizing generator for television systems as claimed in claim 6 wherein said logic means includes a plurality of NOR gates and a plurality of flipflops.

8. A frequency controllable synchronizing generator for television systems as claimed in claim 7 wherein said presettable counter means includes a plurality of binary stages, each stage being presettable.

9. A frequency controllable synchronizing generator for television systems as claimed in claim 8 wherein said plurality of stages equals 12 and wherein outputs are taken from the second, third, fourth and fifth stages as well as from one of the latter stages, said latter stage being determined by the setting of switches connected to the latter stages of said presettable counter.

10. A frequency controllable synchronizing generator for television systems as claimed in claim 9 wherein said adjustable oscillator means is an edge stable multivibrator.